United States Patent
Choi et al.

(10) Patent No.: US 7,480,505 B2
(45) Date of Patent: Jan. 20, 2009

(54) PROVIDING EVOLUTION DATA ONLY (EV-DO) SERVICE IN NETWORK INTERFACING WIRELESS PUBLIC NETWORK AND WIRED/WIRELESS PRIVATE NETWORK

(75) Inventors: Hae-Young Choi, Suwon-si (KR); Doo-Yong Yang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/003,425

(22) Filed: Dec. 6, 2004

(65) Prior Publication Data
US 2005/0176422 A1 Aug. 11, 2005

(30) Foreign Application Priority Data
Feb. 6, 2004 (KR) .................. 10-2004-0008086

(51) Int. Cl.
*H04Q 7/20* (2006.01)
(52) U.S. Cl. .............. 455/426.1; 455/433; 455/554.1; 455/552.1; 455/555; 455/435.1; 370/354; 370/353; 370/355; 370/356; 370/363; 370/374; 370/381
(58) Field of Classification Search ........... 455/426, 455/426.2
See application file for complete search history.

(56) References Cited

U.S. PATENT DOCUMENTS

| | | | | |
|---|---|---|---|---|
| 5,577,029 A | * | 11/1996 | Lu et al. ................. | 455/445 |
| 5,818,824 A | * | 10/1998 | Lu et al. ................. | 370/328 |
| 5,987,317 A | * | 11/1999 | Venturini ............... | 455/412.2 |
| 6,636,516 B1 | * | 10/2003 | Yamano ................ | 370/395.52 |
| 6,671,511 B1 | * | 12/2003 | Forssell et al. ......... | 455/452.1 |
| 2002/0037716 A1 | | 3/2002 | McKenna et al. | |
| 2003/0017845 A1 | * | 1/2003 | Doviak et al. .......... | 455/556 |
| 2004/0001536 A1 | * | 1/2004 | Lohtia et al. ........... | 375/225 |
| 2004/0048601 A1 | * | 3/2004 | Lee et al. .............. | 455/410 |
| 2004/0142682 A1 | * | 7/2004 | Kamiya et al. ......... | 455/418 |

FOREIGN PATENT DOCUMENTS

| | | |
|---|---|---|
| CN | 1339925 | 3/2002 |
| JP | 2003-111124 | 4/2003 |
| JP | 2003-198726 | 7/2003 |

OTHER PUBLICATIONS

Buddhikot et al., "Design and Implementation of WLAN/cdma2000 Interworking Architecture", IEEE Communications Magazine, vol. 41, No. 11, p. 90-100, Nov. 2003.
Australian Office action for Australian Patent Application No. 2004244646, dated Mar. 6, 2006.

(Continued)

*Primary Examiner*—Charles N Appiah
*Assistant Examiner*—Amancio Gonzalez
(74) *Attorney, Agent, or Firm*—Robert E. Bushnell, Esq.

(57) ABSTRACT

An Evolution Data Only (EV-DO) service is provided by a network interfacing a wireless public network and a wired/wireless private network so that an EV-DO call is transmitted via the private network when an EV-DO service is intended to be provided via the private network. An arbitrary terminal sets up an identifier indicating which of the private and public networks is to transmit the EV-DO service and the identifier received from the arbitrary terminal is retrieved to request the EV-DO service via a corresponding network based on the retrieved identifier. Consequently, the EV-DO call is forwarded via the selected network, and since an EV-DO call is forwarded via the private network by modifying the system without changing each user terminal, no additional expense is necessary.

8 Claims, 6 Drawing Sheets

OTHER PUBLICATIONS

Chinese Office Action corresponding to Chinese Patent Application No. 200510007884.4, issued on Dec. 29, 2006.

Japanese Office Action corresponding to Japanese Patent Application No. 2005-024994, issued on Jan. 9, 2007.

* cited by examiner

PROVIDING EVOLUTION DATA ONLY (EV-DO) SERVICE IN NETWORK INTERFACING WIRELESS PUBLIC NETWORK AND WIRED/WIRELESS PRIVATE NETWORK

CLAIM OF PRIORITY

This application makes reference to, incorporates the same herein, and claims all benefits accruing under 35 U.S.C. §119 from an application for METHOD AND SYSTEM FOR PROVIDING EV-DO SERVICE NETWORK INTERWORKING BETWEEN WIRELESS PUBLIC AND WIRED/WIRELESS PRIVATE NETWORK earlier filed in the Korean Intellectual Property Office on 6 Feb. 2004 and there duly assigned Ser. No. 2004-8086.

BACKGROUND OF THE INVENTION

1. Field of the Invention

The present invention relates to a service provided via a network interfacing wireless public and private networks and, more particularly, to providing an Evolution Data Only (EV-DO) service in a network interfacing a wireless public network and a wired/wireless private network, in which the EV-DO service is provided via the private network.

2. Description of the Related Art

As a solution for providing voice communication and data services under an in-building office environment free of charges, a system grafting CDMA-RF technology on a local wired/wireless private branch exchange has appeared for the first time.

The present invention will be described herein with reference to the in-building wireless environment, wherein the in-building wireless environment refers to not only an office environment such as an office building but also a communication environment within a certain zone (e.g., a campus, an army camp, etc.).

A system where a wireless public network is interfaced with a wired/wireless private network makes it possible to make a call anywhere within the building, supports a hand-off function with the public wireless network upon exiting a local zone, and provides a variety of additional services, for example, forwarding an emergency message using a short message service, retrieving necessary in-building information at an external location if an intra-net is established, and so on.

However, this system does not currently support a local EV-DO service function via the private network.

This is because a terminal cannot determine whether the data received currently in the private network has been transmitted via the public network or the private network when the terminal transmits a signal requesting the local EV-DO service.

That is, if a local wireless terminal attempts a call to get a local private network EV-DO service in the network interfacing the wireless public network and the wired/wireless private network, the EV-DO service is provided via the public network unconditionally because there is no information indicating which of the public and private networks is providing the EV-DO service.

Consequently, there is a problem in that the EV-DO service via the private network is unavailable via the existing network where the wireless public network is interfaced with the wired/wireless private network.

SUMMARY OF THE INVENTION

It is an object of the present invention to provide an EV-DO service in a network interfacing a wireless public network and a wired/wireless private network so that a user of a private network selectively uses either the private network EV-DO service or the public network EV-DO service using his or her wireless terminal.

Furthermore, it is another object of the present invention to provide a method in which a call is transmitted including information on the selection of either the private network or the public network in each terminal specification upon requesting an EV-DO service, such that the EV-DO service is provided for a user via a desired network when the user requests the EV-DO service.

According to one aspect of the present invention for achieving these objects, a method is provided comprising: arranging a network interfacing a wireless public network and a wired/wireless private network; setting up, by an arbitrary terminal, an identifier indicating which of the public and private networks is to transmit an Evolution Data Only (EV-DO) service; and retrieving the identifier received from the arbitrary terminal to request the EV-DO service via a corresponding network based on the retrieved identifier.

According to another aspect of the present invention for achieving these objects, a method is provided comprising: arranging a network interfacing a wireless public network and a wired/wireless private network; setting up, by an arbitrary user, information as to which of the public and private networks is to receive an EV-DO service; storing information set up by the user in a private network database; and retrieving stored information of the arbitrary user terminal from the private network database and providing the EV-DO service via a corresponding one of the private network and the public network depending on the retrieved information stored in the private network database upon the arbitrary user requesting the EV-DO service.

The method preferably further comprises releasing a function of setting up the EV-DO service via the private network.

The information is preferably set up by the user inputting and setting up digits using a keypad of a wireless terminal.

The digits preferably comprise a characteristic code including a combination of a private network access code, a function access code, and a private network EV-DO service setup function code.

Storing information set up by the user in a private network database preferably comprises referring to a field for a private network route that is set up for each entry of a private network EV-DO service setup table in a database within a private network control station, wherein an EV-DO service request signal received via a base station is transmitted to a private network control station along with an identifier of a corresponding user terminal.

Retrieving stored information of the arbitrary user terminal from the private network database and providing the EV-DO service preferably comprises the user inputting and setting up a specified number including a characteristic code including a private network access code plus a function access code plus a private network EV-DO service setup and release function code using a keypad of a wireless terminal.

The method preferably further comprises: inputting and setting a characteristic code, the characteristic code being combined with a private network EV-DO service setup function code and a code indicating a time when the private network EV-DO call setup is to be released after a certain time period has elapsed.

Information on the code indicating the time being inputted and set by the user is preferably stored in a timer field of the private network EV-DO setup table in the private network control station database.

According to another aspect of the present invention for achieving these objects, a system is provided comprising: at least one base station adapted to receive a call from an arbitrary wireless Evolution Data Only (EV-DO) terminal and to transmit a call to the arbitrary wireless terminal; a public network adapted to control the call upon transmitting and receiving via the public network an EV-DO call transmitted and received via the at least one base station; a private network including a route determining unit adapted to determine, based on an identifier of a transmission-side terminal included in the EV-DO call received by the base station, which of the private and public networks is to send the EV-DO call, and to transmit the call via a corresponding network; and a private network dedicated private EV-DO system adapted to directly send the EV-DO call via the private network rather than the public network, upon the private network determining that the currently received EV-DO call is a private network call.

The private network preferably comprises: a database having a table structure including a transmission-side terminal identifier field and a field indicating an EV-DO service route; the route determining unit adapted to determine the call service route with respect to a calling identifier by referring to a database that stores the calling identifier of the call received via the base station, and to transmit the call to a corresponding one of the private network and the public network; and a private network control module adapted to transmit the call to the private EV-DO system upon a call received via a data routing software module being a private network EV-DO call and, writing the input to the database upon receiving an input regarding a setup using the private network and the public network from the transmission-side terminal,.

The EV-DO service route field of the database preferably includes an initial setup, the initial setup being set for a public network upon the EV-DO service route not being set by the user.

According to another aspect of the present invention for achieving these objects, a method is provided comprising: transmitting an Evolution Data Only (EV-DO) call by a user; determining, by a private network, based on identifier information, which of the private network and a public network is to transmit the EV-DO call; transmitting the EV-DO call to a private EV-DO system when the call is determined to be a private network EV-DO call based on the identifier information; and transmitting the EV-DO call to a public EV-DO system when the call is determined to be a public network EV-DO call based on the identifier information.

According to another aspect of the present invention for achieving these objects, a system is provided comprising: a terminal adapted to transmit a message along with identifier information upon transmitting an Evolution Data Only (EV-DO) call; at least one base station adapted to receive an EV-DO call from the terminal and to transmit the EV-DO call to an arbitrary wireless terminal; a private network adapted to determine, based on the identifier information included in the EV-DO call received from the terminal, which of the private network and a public network is to transmit the EV-DO call; the public network adapted to control data control upon transmitting and receiving the EV-DO call transmitted and received via the base station; and a private network dedicated private EV-DO system adapted to directly provide the EV-DO service via the private network rather than the public network upon the private network determining that the currently received EV-DO call is a private network EV-DO call.

The terminal is preferably adapted to display the network via which the EV-DO service is being transmitted, a remaining number of times of transmission and a remaining time on a display.

The display preferably comprises a liquid crystal display.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Hereinafter, exemplary embodiments of the present invention will be described in detail with reference to the accompanying drawings so that those skilled in the art to which the present invention pertains can easily carry out the present invention.

Figure 1:
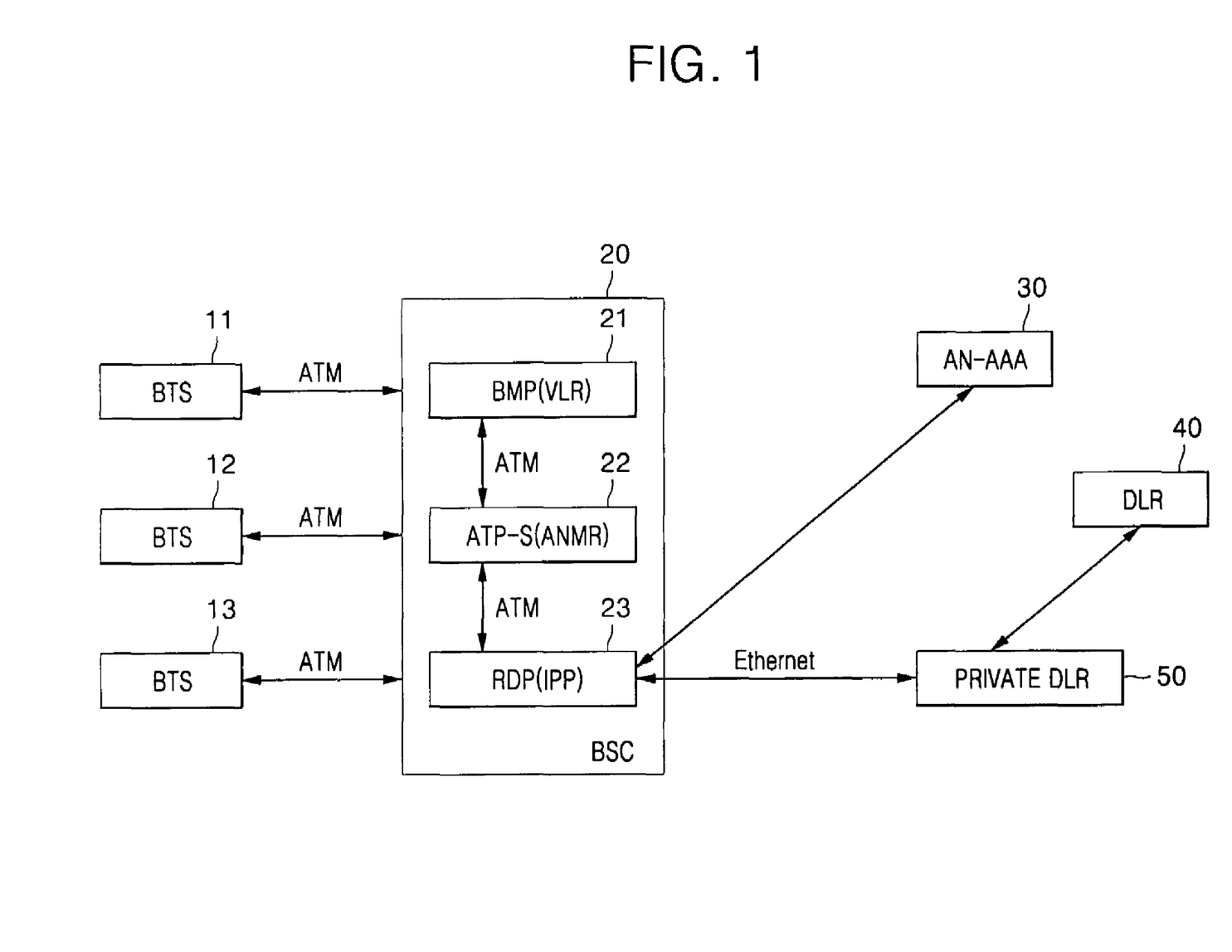
FIG. 1 is a block diagram of a system which interfaces with a wireless private network for a private EV-DO service.

FIG. 1 is a block diagram of a system interfacing with a wireless private network for a private EV-DO service.

A network interfacing with a wireless private network for a private EV-DO service, as shown in FIG. 1, includes Base Transceiver Stations (BTSs) 11, 12 and 13 for relaying an EV-DO service signal transmitted to and received from an arbitrary terminal, a Base Station Controller (BSC) control station 20 for matching the signals received from the BTSs 11, 12, and 13, an Access Network Authentication Accounting Authorization (AN-AAA) 30 for controlling public network terminal authentication or the like, a Data Location Register (DLR) 40 for storing position information of the terminal or the like, and a private DLR 50 for storing position information of the private EV-DO terminal or the like.

The wireless terminal of the present invention can be used in both the public EV-DO and the private EV-DO networks.

Each of the BTSs 11, 12 and 13 has a predetermined public wireless region, establishes a session to enable a call to be terminated at the terminal if the terminal enters the region, and relays a call access request signal to the BSC 20 if there is a call access request from the terminal.

The BSC 20 includes a BSC Main Processor (BMP) 21 for controlling the BSC 20, an ATP-S 22 for routing the received EV-DO call to the public network, and a RAN PDN Processor (RDP) 23 for providing an interface with the DLR 40 or the AN-AAA 30.

If a signal to request an EV-DO service from the arbitrary wireless EV-DO terminal is transmitted to the BTSs 11, 12 and 13 in the corresponding region when the system is configured as noted above, the ATP-S 22 routes the EV-DO call to the corresponding network.

Figure 2:
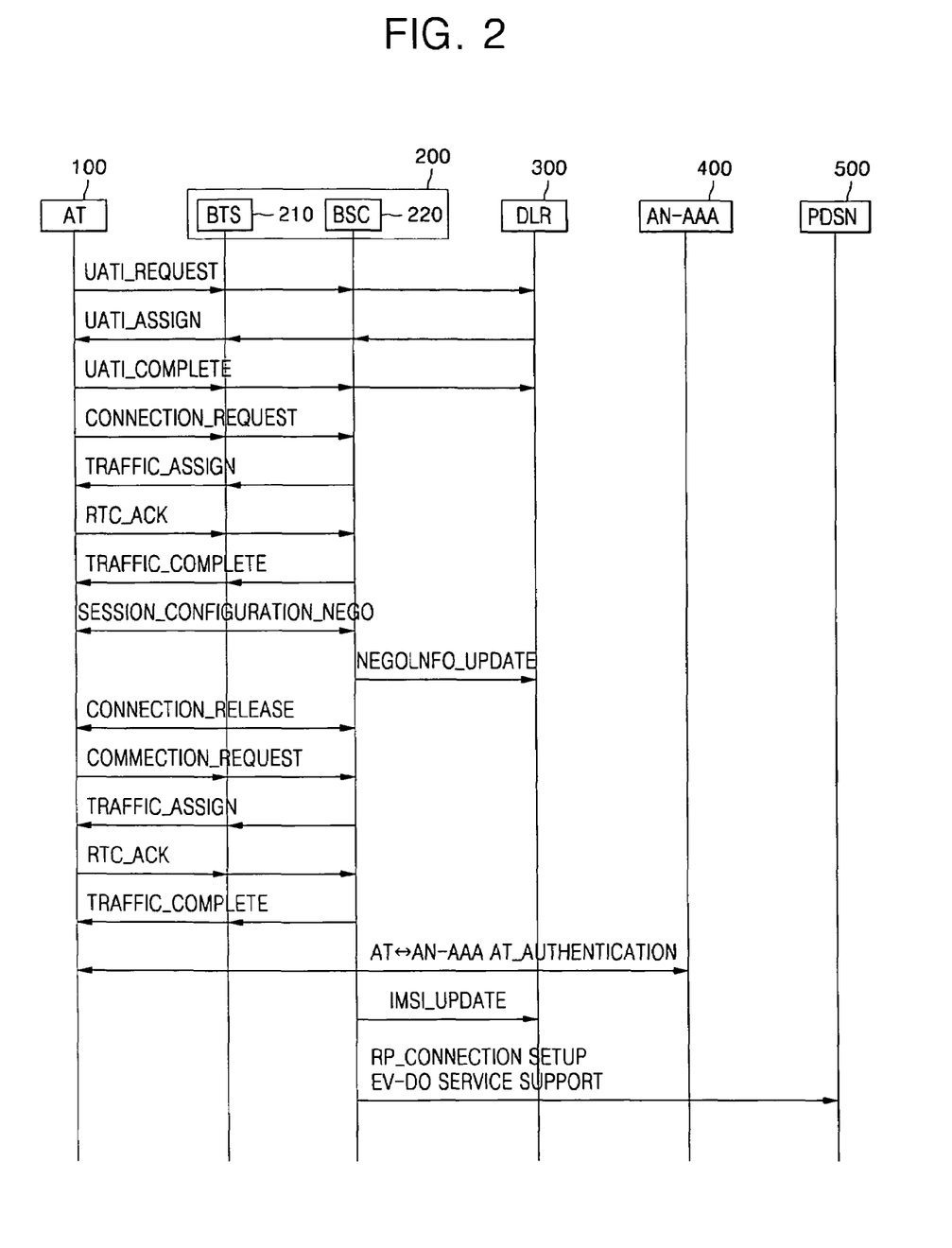
FIG. 2 is a view of a process of providing an EV-DO service in a network interfacing a wireless public network and a wired/wireless private network.

FIG. 2 is a view of a process of providing an EV-DO service in a network interfacing a wireless public network and a wired/wireless private network.

Referring to FIG. 2, the arbitrary terminal (AT: Access Terminal) 100 attempts a Unicast Access Terminal Identifier (UATI) allocation to be assigned a UATI from an Access Network (AN), which is a factor for discriminating an EV-DO service within an air section (UATI_Request).

The BSC 220 corresponding to the access network accesses the DLR 300 of the system to be allocated an UATI, and forwards the UATI to the AT 100 (UATI_Assign).

Thereafter, the AT 100 is allocated the UATI and requests a traffic channel allocation to negotiate a session (Connection_Request). If a traffic channel is established, the AT 100 allocates a traffic dedicated SVC setup between the BTS 210 and the BSC 220, and the PDSN 500 stage allocates the IP.

Thereafter, the AT 100 performs an AT 100 initialization negotiation process and then performs a BSC 220 initialization negotiation process to negotiate a protocol on an EV-DO specification (Session_Configuration_Nego).

When the negotiation for the terminal protocol has been completed, the AT 100 forwards updated negotiation information to the DLR 300 (Negoinfo_Update). Then, the AT 100 releases the traffic channel allocated for the session negotiation (Connection_Release).

The AT 100 requests traffic channel allocation for authentication by the service provider (Connection_Request). If the traffic channel has been established, the AT 100 accesses the AN-AAA 400 server using the network access identifier and the password and attempts the authentication.

If the BSC 220 succeeds in the authentication, the BSC 220 will acquire an IMSI from the AN-AAA 400.

The BSC 220 sends the IMSI information to the DLR 300 to update the IMSI information (IMSI_Update). Then, the AT 100 sets up a connection with a Packet Data Serving Node (PDSN) 500 (RP_Connection Setup) to get an EV-DO service.

As such, there is a structural problem in that, since the terminal accesses the system without including any discrimination information to discriminate services in the Connection Request message upon transmitting the Connection Request message, the terminal must transmit a corresponding call unconditionally via the public network.

Figure 3:
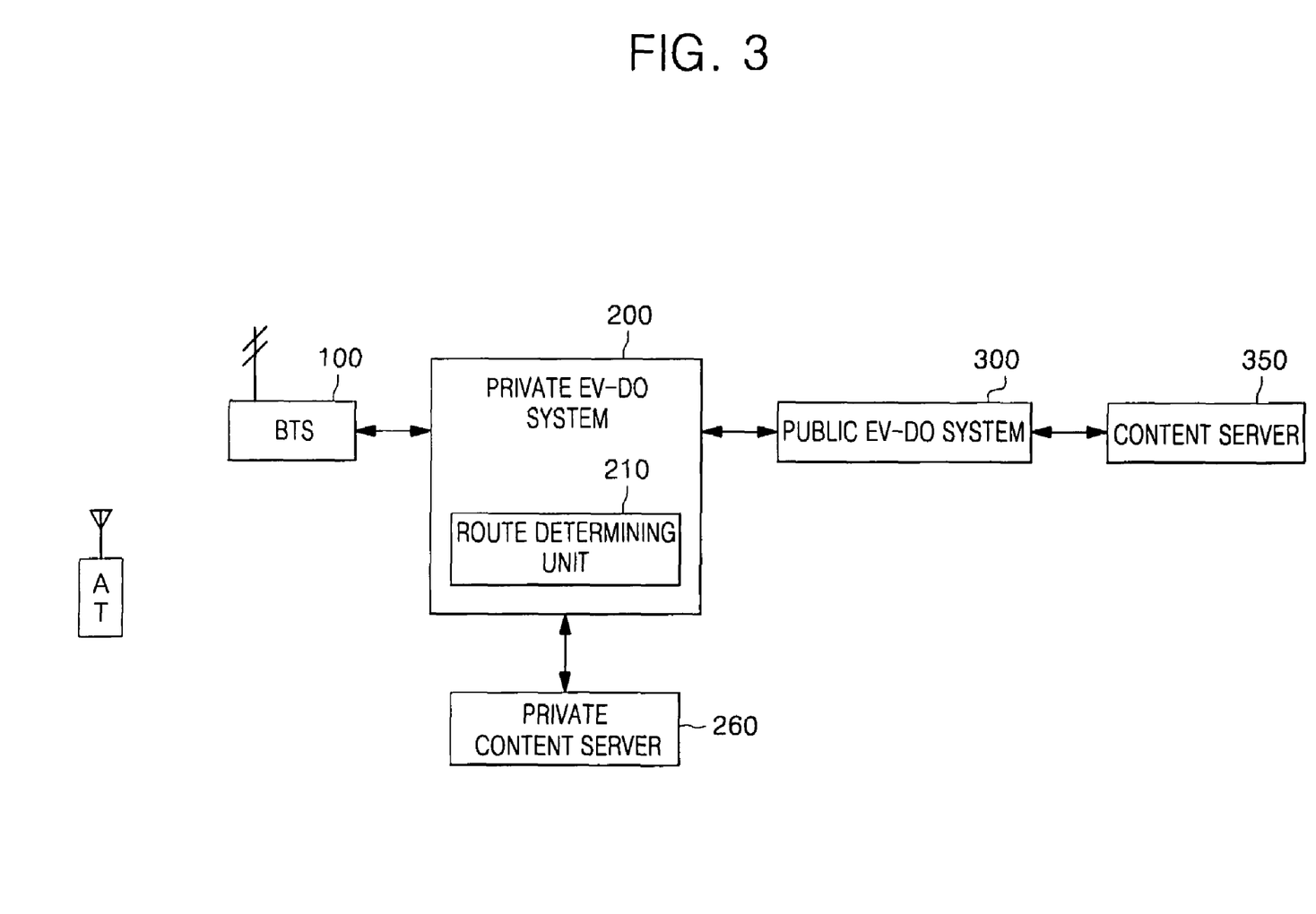
FIG. 3 is a block diagram regarding selection of a corresponding network and providing an EV-DO service in a network interfacing a wireless public network and a wired/wireless private network according to an embodiment of the present invention.

FIG. 3 is a block diagram of a corresponding network selection and EV-DO service provision in a network interfacing a wireless public network and a wired/wireless private network according to an embodiment of the present invention.

The wired/wireless private network in the discussion of the present invention is either a wireless private network or a private network connected by wire or wireless.

The public EV-DO system 300 further includes a content server 350 for providing an EV-DO service.

The private EV-DO system 200 further includes a private content server 260 for providing an EV-DO service, and a route determining unit 210 for determining which of the networks is to provide the EV-DO service.

The route determining unit 210 determines which of the networks to transmit an EV-DO call, based on a route identifier included in an EV-DO request signal received from the transmission-side terminal (Access Terminal; AT).

Alternatively, the route determining unit 210 receives a setup message from the transmission-side terminal AT in advance, which indicates that the transmission-side terminal will transmit the EV-DO via the private network, and stores this information in the private EV-DO system 200 so that an EV-DO request signal from the transmission-side terminal AT generated later is transmitted either via the private network or the public network on the basis of the information that has been set up by the user.

A process is described below in which the transmission-side terminal actually transmits an EV-DO service request signal and receives an EV-DO service from a corresponding network when the network has been configured as described above.

First, if the transmission-side terminal AT transmits an EV-DO service request signal, the private EV-DO system 200 will receive this signal via a BTS 100 present in a coverage area.

The route determining unit 210 in the private EV-DO system 200 determines which of the networks has transmitted the EV-DO call on the basis of the identifier included in the received EV-DO service request signal.

If it is determined that the EV-DO call has been transmitted via the private network, this EV-DO call is transmitted to the private content server 260 so that a corresponding EV-DO service is provided.

If it is determined that the EV-DO call has been transmitted via the public network, this EV-DO call is transmitted to the public network content server 350 so that a corresponding EV-DO service is provided.

Hereinafter, a system in which a private network is connected to and operates with a part of a public network will be described by way of example.

Figure 4:
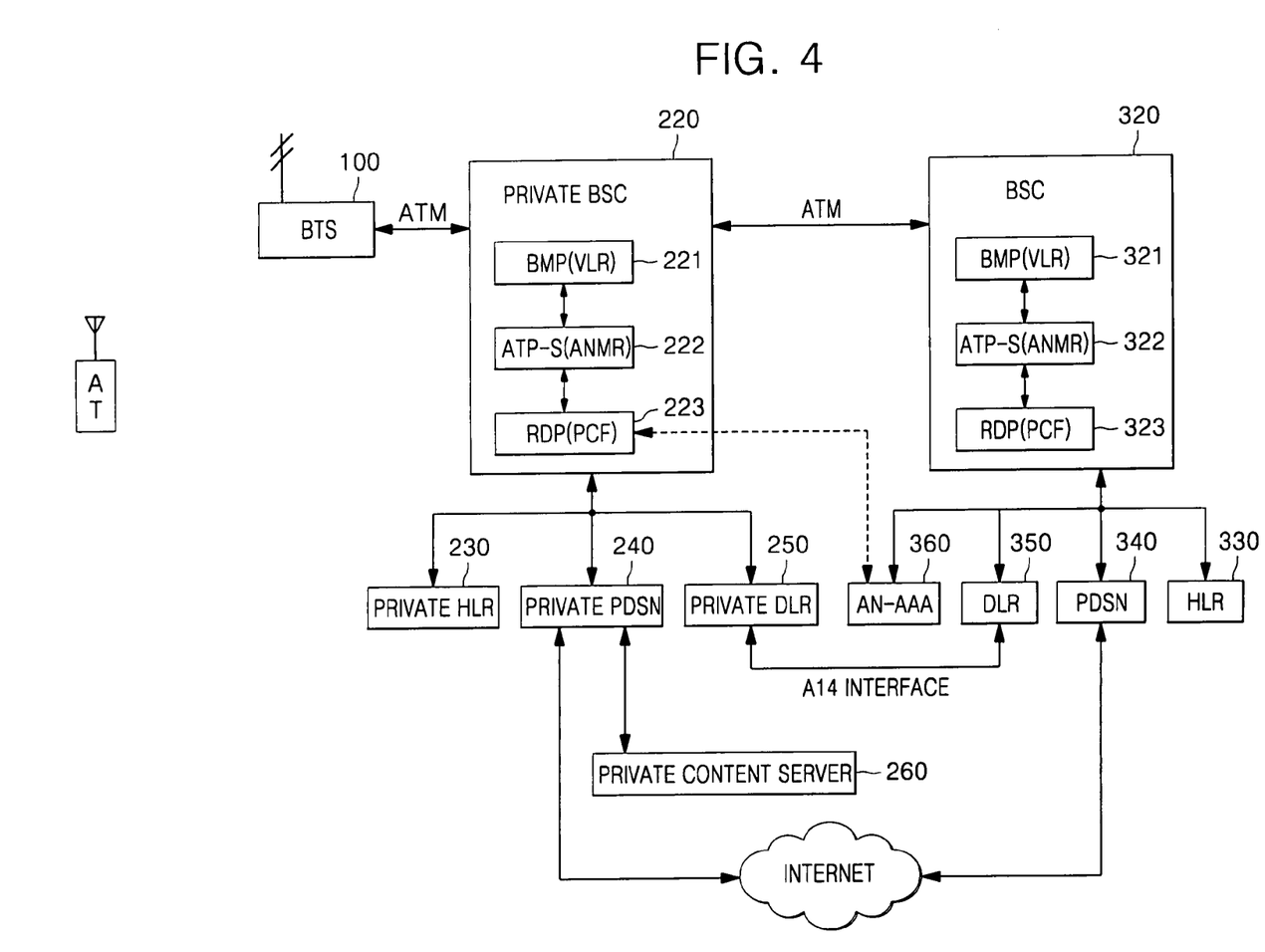
FIG. 4 is a block diagram of a system of providing an EV-DO service in a system where a private network is connected to a BSC stage of a public network.

FIG. 4 is a block diagram of a system of providing an EV-DO service in a system where a private network is connected to a BSC stage of a public network.

Referring to FIG. 4, the system includes a BTS 100, a private BSC 220, a BSC 320, a private HLR 230, a private PDSN 240, a private DLR 250, a private content server 260, an HLR 330, a PDSN 340, a DLR 350, and an AN-AAA 360.

The BSC 320 includes a BSC Main Processor (BMP) 321 for controlling the BSC, an ATP-S 322 for routing a received EV-DO call to the public network, and a RDP (PCF) 323 for providing an interface with the DLR 350 or the AN-AAA 360.

The Home Location Register (HLR) 330 is a server having subscriber information, and the necessary subscriber information is obtained by accessing the HLR 330 when the subscriber requests the service.

The PDSN 340 is a node that connects the RDP (PCF) 323 of the BSC 320 to an Internet network. The PDSN 340 allows IP to be allocated to the terminal AT by supporting PPP. The PDSN 340 can be used in common for the CDMA 1x call and the EV-DO call.

The Data Location Register (DLR) 350 is a server that manages EV-DO subscriber information. The DLR allocates The UATI to the EV-DO subscriber, and stores session information after a terminal session negotiation has been performed and terminal IMSI information after an authentication process has been performed. Then, the DLR provides terminal information when the subscriber requests the service, as in the HLR 330.

The AN-AAA 360 is an authentication server having authentication information for EV-DO subscribers, and forwards the terminal IMSI information to the BSC 320 if the subscriber accesses it and succeeds in the authentication. The BSC 320 stores the information received from the AN-AAA 360 in the DLR 350 and can use this information by accessing the DLR 350 if the terminal requests the service later.

The private BSC 220 includes a BSC Main Processor (BMP) 221 for setting a function code received from the terminal and controlling the BSC, an ATP-S 222 for routing the received EV-DO call to a corresponding network depending on an identifier or preset function code information of the call, and a RDP (PCF) 223 for providing an interface with the DLR 250 or the AN-AAA 360.

The private DLR 250 fetches the subscriber information via an A14 interface that provides an air section data transmission interface with the public network DLR 350, wherein a dedicated line or an internal ATM network can be used as a path. The private DLR itself cannot allocate the UATI. Accordingly, the private DLR must obtain the USTI from the public network DLR 350.

The private PDSN 240 can be a software block and can be added to the RDP (PCF) 223, the ATP-S 222, or the BMP 221.

The private HLR 230 is a server having private EV-DO call setup subscriber information, and it is possible to obtain necessary subscriber information by accessing the HLR 230 when the subscriber requests a private EV-DO call service.

In order to provide the EV-DO service to the user via the private network in this configuration, a process of establishing a route for the private network data service must be preceded.

Accordingly, the user stores a setup value for network usage in the BMP 21 by setting up function code use buttons on the terminal as to which of the networks provides the EV-DO service to the user before the user forwards the EV-DO call.

If an initial setup (default) is set for the public network, a setup must be made in advance as to using the private network when the user desires the service via the private network.

On the other hand, if the initial setup (default) is set for the private network, a setup must be made in advance as to using the public network when the user desires the service via the public network.

That is, if this terminal is set for the public network EV-DO in the BMP 221, a corresponding EV-DO call is routed to the AN-AAA 30 and the DLR 350 while if the terminal is set for the private network EV-DO, the corresponding EV-DO call is routed to the AN-AAA 360 and the private DLR 250.

As described above, the user must first perform a process of setting up a function code on the terminal to designate the EV-DO usage network before getting an EV-DO service via the corresponding network.

The process of setting up the private network designating function code is achieved by inputting a private network access code (#), a function access code (#) and a characteristic code, and transmitting them to the EV-DO system.

At this time, the terminal will access the system in an EV-DO mode since it is adapted to operate in a hybrid mode.

If the EV-DO system receives a corresponding code, it sets information in the BMP (VLR: Virtual Location Register) 21 to select a network which will be used by the corresponding terminal.

A terminal ID (MIN and ESN) is inputted to the VLR in advance.

In addition, the transmission-side terminal ID includes International Mobile Subscriber Identity (IMSI), Temporary Mobile Subscriber Identity (TMSI), and the like.

The MIN is a terminal telephone number and is represented in the form of 10-decimal digits. The ESN is a discriminator assigned to the terminal and is assigned 8 bits.

A way of representing the terminal ID varies according to the type of the terminal. The terminal ID can be recognized based on any one of MIN, ESN IMSI, and TMSI.

Although the private network access code is defined as "#" and the function access code is also defined as "#" in the present invention, other values can be used when they have been defined for the codes. That is, "*" or values of any other number keys can be used when they have been defined for the codes.

The code values for the private network access code, the function access code, and the characteristic code are stored in a database in the private network control station to enable a function corresponding to the corresponding code to be performed depending on a dial digit value transmitted from an arbitrary transmission-side terminal.

Furthermore, an operator's function setting enables support of a specific service for a subscriber present in a specific region at a specific time. It is possible to set up the system so that, in a working time period (e.g., 8:00–17:00), the private EV-DO service is supported for a subscriber present in a corresponding region (e.g., an office). This can be defined by the operator or a service provider.

Releasing the function code setup for the selection of private network usage that has been made as described above is possible and can be performed by the following methods.

1. If a private network access code (#) plus a function access code (#) plus a characteristic code (a code that means the release) is inputted, the EV-DO service is provided via the public network;

2. If the terminal does not access the private EV-DO network during a certain time period, the private network access function is automatically released by operating a timer; and 3. The private network access function is automatically released after the private EV-DO service call has been completed.

In addition, it is possible to set up a variety of network usage options by using both the function code and the characteristic code.

A method of providing an actual EV-DO call service when the function code is set up as described above proceeds in two following ways.

First, the case of the public network EV-DO service will be omitted since it is unrelated to whether or not the authentication has been made. The case of the private EV-DO service will be described in which the case will be divided into an authenticated state and an unauthenticated state.

If the subscriber requests the private EV-DO service, the private DLR requests subscriber information from the public DLR via the A14 interface. At this time, there are two cases: namely, when the received subscriber information includes authentication information (IMSI) and when the subscriber information does not include the authentication information.

The private EV-DO service can be provided since all of the information as to whether or not the BSC corresponding to the access network can support the service is included when the subscriber information includes the IMSI while the BSC must obtain the IMSI information to provide the service when the subscriber information does not include the IMSI.

Hereinafter, a description of a process of proceeding with a private EV-DO service when a terminal is authenticated follows with reference to FIG. 5.

Figure 5:
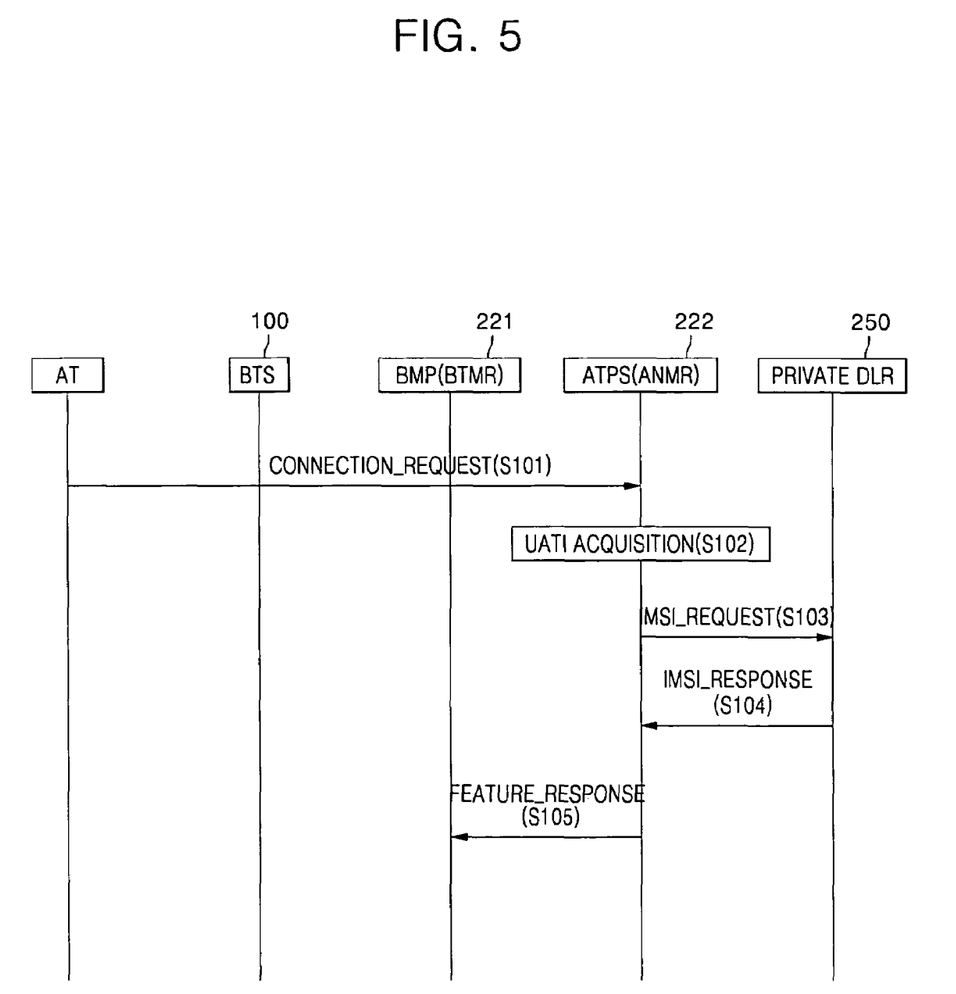
FIG. 5 is a view of a method in which a terminal provides an EV-DO service when the terminal is authenticated in a network interfacing a wireless public network and a wired/wireless private network according to an embodiment of the present invention.

FIG. 5 is a view of a method in which a terminal provides an EV-DO service when the terminal is authenticated in a network interfacing a wireless public network and a wired/wireless private network according to an embodiment of the present invention.

If an arbitrary access terminal (AT) in a private network service region transmits a Connection_Request message to request the EV-DO (S101), the Access Network Message Router (ANMR) of the ATPS 222 acquires The UATI of the corresponding terminal from a header of the Connection_Request message, which is an access message from the terminal (S102).

If the ANMR transmits an IMSI_Request message to the private DLR 250 along with the acquired UATI (S103), the private DLR 250 delivers an IMSI_Response responsive to an IMSI value which corresponds to the UATI, to the ATPS 222 (S104).

This IMSI value is transmitted to the BTMR of the BMP 221 (S105), so that the BTMR refers to usage network setup status of a corresponding terminal which corresponds to the IMSI value stored in the VLR.

If the corresponding terminal is set to desiring the private EV-DO, the currently generated EV-DO call is routed to the private network while if the corresponding terminal is set to desiring the public EV-DO, the call is routed to the public network.

Figure 6:
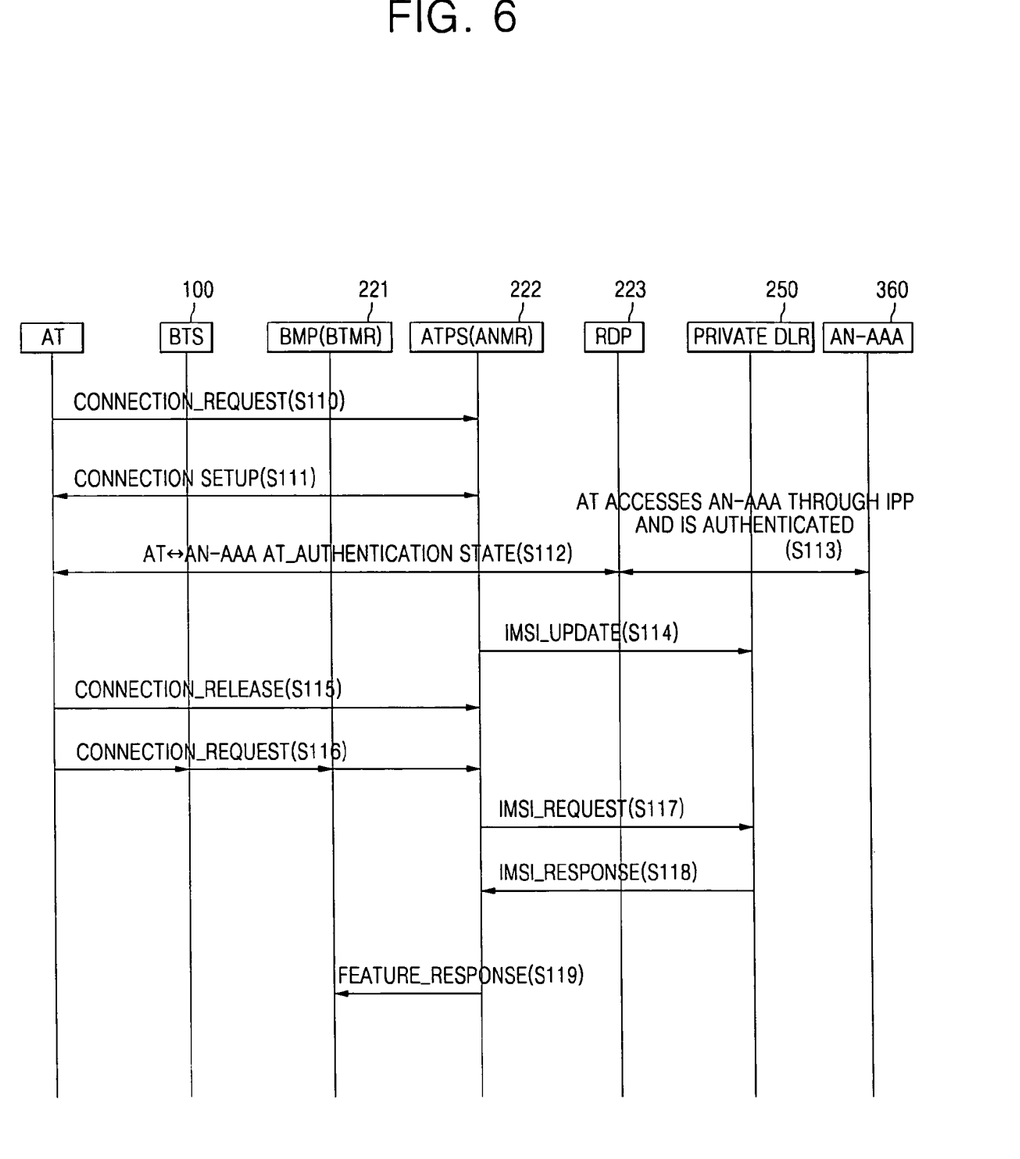
FIG. 6 is a view of a method of providing an EV-DO service when there is no authentication in a network interfacing a wireless public network and a wired/wireless private network according to an embodiment of the present invention.

The above method is an operation when the terminal has been authenticated by the AN-AAA. Hereinafter, an operation when the terminal is not authenticated by the AN-AAA is described.

FIG. 6 is a diagram of a method of providing an EV-DO service when the authentication is not made in a network interfacing a wireless public network and a wired/wireless private network according to an embodiment of the present invention.

If an arbitrary access terminal (AT) in the private network service region transmits a Connection_Request message to request the EV-DO (S110), the Access Network Message Router (ANMR) of the ATPS 222 acquires The UATI of the corresponding terminal from a header of the Connection_Request message, which is an access message from the terminal (S102).

The private DLR 250 cannot receive information set by the function code since it does not have an IMSI even though the ANMR transmits an IMSI_Request message to the private DLR 250 along with the acquired UATI.

If the message is routed to the public network, a service state becomes immediately after the authentication is completed. Accordingly, a case can be generated where the terminal of which the subscriber has requested the private EV-DO service will use the public network service. Accordingly, a Connection_Request from a terminal which has not yet been authenticated must be routed to the private network.

Thus, if a connection between the terminal and the ATPS 222 is set up (S111), the authentication procedure is immediately attempted (S112). If there is a dedicated line between the AN-AAA 360 and the RDP 223, direct access can be made via the dedicated line. If the direct access is impossible, the access can be made via the IPC.

After the authentication has been completed, the IMSI information of the terminal is forwarded to the private DLR 250 (S114) and then the connection is released at the ATPS 222 (S115).

Thus, before the terminal that has requested the private EV-DO service is authenticated, the Connection_Request message is routed and processed to the private network.

If the terminal attempts access later after the terminal has been authenticated as stated above, the Access Network Message Router (ANMR) of the ATPS 22 receives a Connection_Request message which is an access message from the terminal (S116), and acquires The UATI of a corresponding terminal from a header of this message.

If the ANMR transmits the acquired UATI and an IMSI_Request message to the private DLR 250 (S117), the private DLR 250 delivers an IMSI_Response responsive to an IMSI value which corresponds to the UATI, to the ATPS 222 (S118).

This IMSI value is transmitted to the BTMR of the BMP 221 (S119), so that the BTMR refers to usage network setup status of a corresponding terminal which corresponds to the IMSI value stored in the VLR.

If the corresponding terminal is set as desiring the private EV-DO, the currently generated EV-DO call is routed to the private network while if the corresponding terminal is set as desiring the public EV-DO, the call is routed to the public network.

In a method in accordance with an embodiment of the present invention, a private network or a public network EV-DO service can be provided after the network is set up for the EV-DO service, and a usage network is set up at the same time that the data service call is requested by forwarding an identifier indicating which network is to transmit the data upon requesting the EV-DO service call.

It will be appreciated that although the method in accordance with an embodiment of the present invention in which a usage network is set up at the same time that the EV-DO service call is requested by forwarding the identifier indicating which network is to transmit the data upon requesting the EV-DO service call has been illustrated by way of the manner in which the route determining unit recognizes the identifier and forwards a corresponding EV-DO call via the network indicated by the identifier, several other variations are possible.

When the specification of the terminal is changed, the terminal is adapted to display various information, such as the network via which the EV-DO service is transmitted, the remaining number of times of transmission, the remaining time and so forth, on a display, such as a liquid crystal display. The user then knows which network transmits the EV-DO service by the various information related to the data service transmission.

As described above, according to the present invention, an EV-DO service can be forwarded via either a public network or a private network of a wireless public network interfaced with a wired/wireless private networks, thereby providing convenience for the user.

Furthermore, there is an advantage in that an EV-DO service is available via the private network by upgrading software in the system without changing hardware and software in each user terminal, thus avoiding an additional cost.

Although exemplary embodiments of the present invention have been described in detail, it will be appreciated by those skilled in the art to which the present invention pertains that variations or modifications can be made to the present invention without departing from the technical spirit and scope of the present invention as recited in the appended claims.

What is claimed is:

1. A method comprising:
 arranging a network interfacing a wireless public network and a wired/wireless private network;
 setting up, by an arbitrary terminal, an identifier indicating which of the public and private networks is to transmit an Evolution Data Only (EV-DO) service and storing the identifier in a database; and retrieving the stored identifier received from the arbitrary terminal to request the EV-DO service via a corresponding network based on the retrieved identifier;

wherein the identifier is set up by the arbitrary terminal inputting and setting up digits using a keypad of a wireless terminal, the digits including a characteristic code including a combination of a private network access code, a function access code, and a private network EV-DO service setup function code.

2. A method comprising:

arranging a network interfacing a wireless public network and a wired/wireless private network;

setting up, by an arbitrary terminal, an identifier indicating which of the public and private networks is to transmit an Evolution Data Only (EV-DO) service;

storing the identifier set up by the arbitrary terminal in a private network data base;

retrieving the identifier received from the arbitrary terminal to request the EV-DO service via a corresponding network based on the retrieved identifier; and wherein storing the identifier set up by the arbitrary terminal in a private network database comprises referring to a field for a private network route that is set up for each entry of a private network EV-DO service setup table in a database within a private network control station, wherein an EV-DO service request signal received via a base station is transmitted to a private network control station along with an identifier of a corresponding user terminal.

3. A method comprising:

arranging a network interfacing a wireless public network and a wired/wireless private network;

setting up, by an arbitrary terminal, an identifier indicating which of the public and private networks is to transmit an Evolution Data Only (EV-DO) service;

storing the identifier set up by the arbitrary terminal in a private network data base;

retrieving the identifier received from the arbitrary terminal to request the EV-DO service via a corresponding network based on the retrieved identifier; and releasing a function of setting up the EV-DO service via the private network;

wherein retrieving the stored identifier set up by the arbitrary user terminal from the private network database and providing the EV-DO service comprises the arbitrary user terminal inputting and setting up a specified number including a characteristic code including a private network access code plus a function access code plus a private network EV-DO service setup and release function code using a keypad of a wireless terminal.

4. The method of claim 3, further comprising: inputting and setting a characteristic code, the characteristic code being combined with a private network EV-DO service setup function code and a code indicating a time when the private network EV-DO call setup is to be released after a certain time period has elapsed.

5. The method of claim 4, wherein information on the code indicating the time being inputted and set by the user is stored in a timer field of the private network EV-DO setup table in the private network control station database.

6. A system comprising:

at least one base station adapted to receive a call from an arbitrary wireless Evolution Data Only (EV-DO) terminal and to transmit a call to the arbitrary wireless terminal;

a public network adapted to control the call upon transmitting and receiving via the public network an EV-DO call transmitted and received via the at least one base station;

a private network including a route determining unit adapted to determine, based on an identifier of a transmission-side terminal included in the EV-DO call received by the base station, which of the private and public networks is to send the EV-DO call, and to transmit the call via a corresponding network; and a private network dedicated private EV-DO system adapted to directly send the EV-DO call via the private network rather than the public network, upon the private network determining that the currently received EV-DO call is a private network call;

wherein the private network comprises:

a database having a table structure including a transmission-side terminal identifier field and a field indicating an EV-DO service route;

the route determining unit adapted to determine the call service route with respect to a calling identifier by referring to a database that stores the calling identifier of the call received via the base station, and to transmit the call to a corresponding one of the private network and the public network; and a private network control module adapted to transmit the call to the private EV-DO system upon a call received via a data routing software module being a private network EV-DO call and, writing the input to the database upon receiving an input regarding a setup using the private network and the public network from the transmission-side terminal;

wherein the EV-DO service route field of the database includes an initial setup, the initial setup being set for a public network upon the EV-DO service route not being set by a user.

7. A system comprising:

a terminal adapted to transmit a message along with identifier information upon transmitting an Evolution Data Only (EV-DO) call;

at least one base station adapted to receive an EV-DO call from the terminal and to transmit the EV-DO call to an arbitrary wireless terminal;

a private network adapted to determine, based on the identifier information included in the EV-DO call received from the terminal, which of the private network and a public network is to transmit the EV-DO call;

the public network adapted to control data control upon transmitting and receiving the EV-DO call transmitted and received via the base station; and a private network dedicated private EV-DO system adapted to directly provide the EV-DO service via the private network rather than the public network upon the private network determining that the currently received EV-DO call is a private network EV-DO call;

wherein the terminal is adapted to display the network via which the EV-DO service is being transmitted, a remaining number of times of transmission and a remaining time on a display.

8. The system of claim 7, wherein the display comprises a liquid crystal display.

* * * * *